United States Patent [19]
Wagner et al.

[11] 3,927,820
[45] Dec. 23, 1975

[54] CONTAINER

[75] Inventors: Ulrich Wagner, Esslinger; Eugen Scherr, Ebersbach, both of Germany

[73] Assignee: Wilhelm Wagner, Esslingen, Germany

[22] Filed: Aug. 7, 1972

[21] Appl. No.: 278,359

[30] Foreign Application Priority Data
Aug. 6, 1971  Germany............................ 2139587

[52] U.S. Cl............ 229/3.5 MF; 206/468; 220/309; 220/345; 229/43
[51] Int. Cl.²............................................ B65D 1/00
[58] Field of Search......... 220/59, 41, 74, 309, 345, 220/346; 229/3.5 MF, 43; 206/45.34, 468

[56] References Cited
UNITED STATES PATENTS

| | | | |
|---|---|---|---|
| 2,093,508 | 9/1937 | Batdorf................................. | 220/41 |
| 2,777,601 | 1/1957 | Cheeley............................... | 229/3.5 MF |
| 3,101,864 | 8/1963 | Glickman............................. | 206/45.34 |
| 3,144,974 | 8/1964 | Eichner................................ | 229/3.5 MF |
| 3,402,874 | 9/1968 | Sternau................................ | 229/43 |

FOREIGN PATENTS OR APPLICATIONS

| | | | |
|---|---|---|---|
| 1,270,485 | 6/1968 | Germany............................. | 229/3.5 MF |
| 1,809,797 | 8/1969 | Germany............................. | 229/43 |

*Primary Examiner*—George E. Lowrance
*Attorney, Agent, or Firm*—Edwin E. Greigg

[57] ABSTRACT

There is described a two-part container particularly for ready-to-serve prepared food, formed of a receptacle portion having a continuous flange and a lid portion held on the receptacle portion. At two opposed sides, the lid portion has integral retaining clips which are bent partially around the receptacle flange and which continue in integral grip tabs for manually disengaging the associated retaining clip from the receptacle flange. On both sides of the lid from one retaining clip to the other there extends a bent-down edge portion which, in cooperation with the receptacle flange, prevents the lid from sliding on the receptacle sideways with respect to the retaining clips.

13 Claims, 6 Drawing Figures

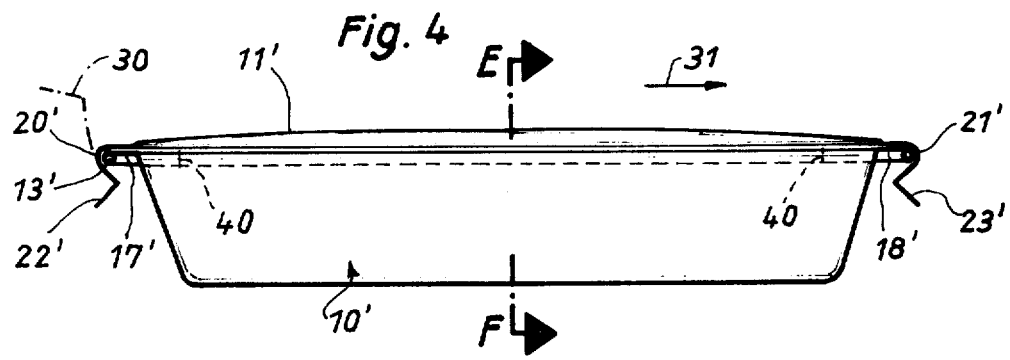
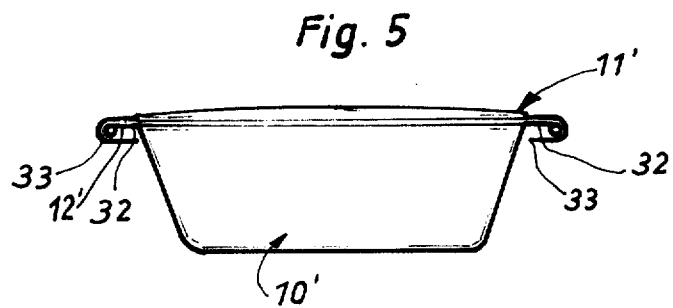
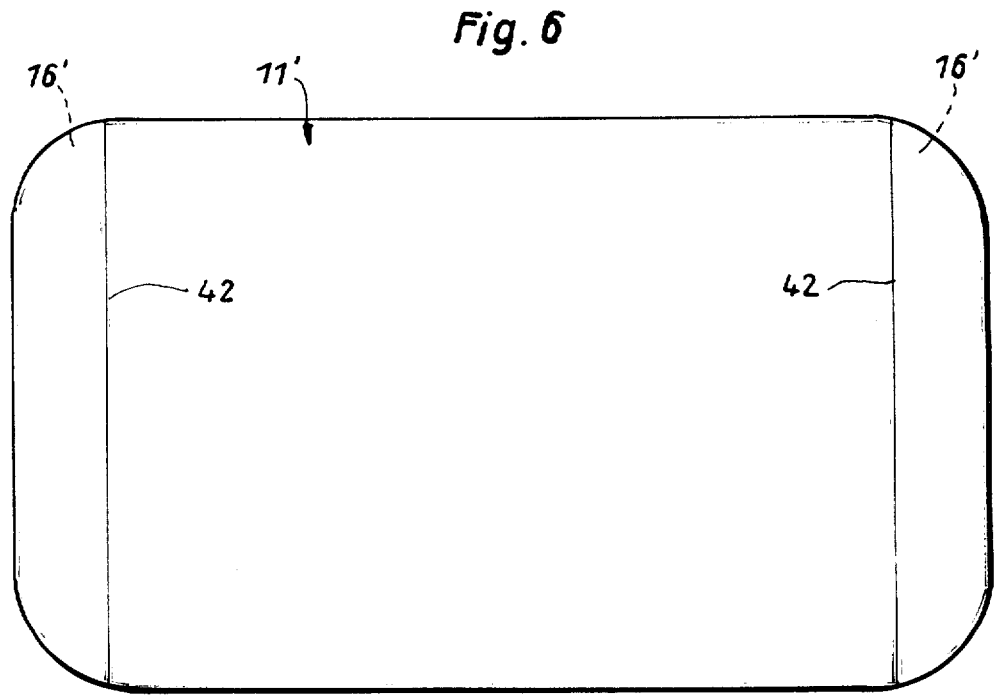

CONTAINER

BACKGROUND OF THE INVENTION

This invention relates to a thin-walled container made of aluminum or similar metal, particularly for prepared, ready-to-serve food or the like, and is of the type which has a lower, or receptacle portion (hereinafter referred to as "receptacle") and an upper or lid portion (hereinafter referred to as "lid") removably secured to the receptacle to close the same. The receptacle which contains the food and which may constitute a serving dish, has a reinforcing edge flange at its upper rim.

The invention relates particularly to those types of containers in which the food may be heated prior to the removal of the lid.

OBJECTS, SUMMARY AND ADVANTAGES OF THE INVENTION

It is an object of the invention to provide a food container of the aforenoted type which is particularly adapted to be used in airplanes and which may be opened without the danger of spilling, not only by flight personnel, but also by passengers wholly inexperienced in opening such containers.

It is a desideratum that after removal of the lid, the latter serve as a support tray for the receptacle. Such a feature has the advantage that the personnel does not have to collect the removed lids right away and further, the passengers will be less tempted to throw the lids on the floor or hide them in the pockets on the back side of the seat in front. In view of the cramped spatial conditions in airplanes and also, in view of the fact that the trays which are handed to the passengers are generally loaded with containers, bowls, utensils, etc., it is important that the lid be removable in a simple manner in its entirety without the necessity of lifting the container from the tray or the table. On the other hand, the lid should be attached sufficiently securely to the receptacle to avoid accidental removal thereof during transportation. Although the lid should close the receptacle well, a fluid-tight engagement is not required.

Briefly stated, according to the invention, in a thin-walled container of the afore-discussed type, the lid is, along two opposed edge zones, bent around retaining zones of the receptacle flange from above downwardly and inwardly to form retaining clips. At least one of the retaining clips continues in an integral tab portion by means of which the lid may be separated from the associated retaining zone of the receptacle. Further, the lid is designed in such a manner that subsequent to the disengagement of the retaining clip, it is possible to easily remove the lid from the receptacle with one movement of the hand.

The invention will be better understood as well as further objects and advantages become more apparent from the ensuing specification of two exemplary embodiments taken in conjunction with the drawing.

BRIEF DESCRIPTION OF THE DRAWING

FIG. 4 is a sectional elevational view of a second embodiment of the invention;

FIG. 5 is a sectional view along line E-F of FIG. 4 and

FIG. 6 is a top plan view of the embodiment illustrated in FIGS. 4 and 5.

DESCRIPTION OF THE EMBODIMENTS

Figure 1:
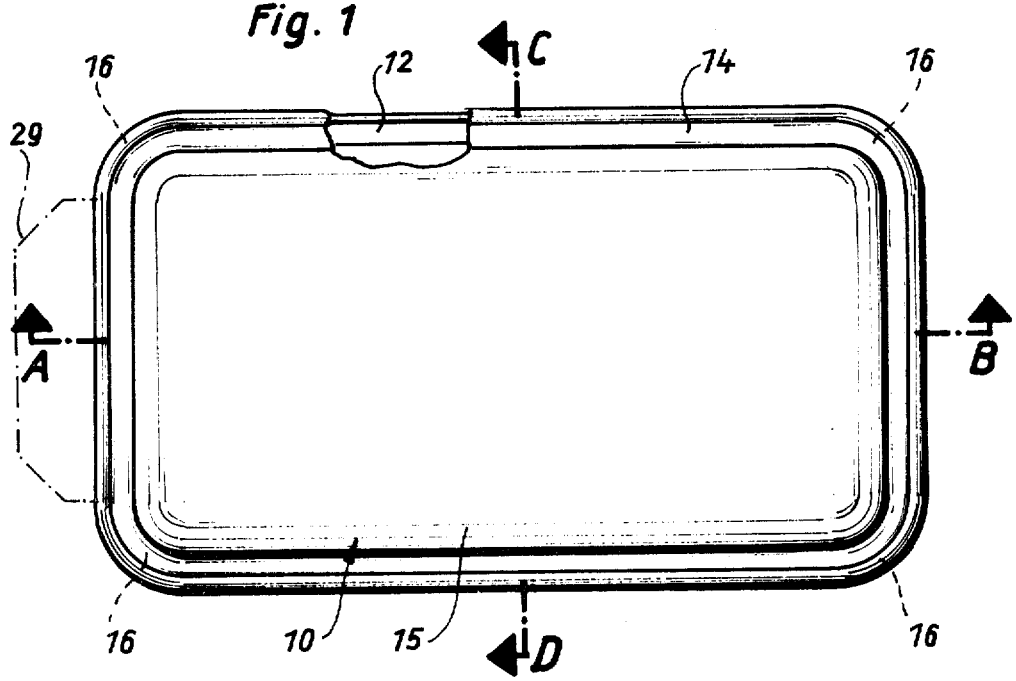
FIG. 1 is a partially broken-away top plan view of a first embodiment of the invention.
Figure 2:
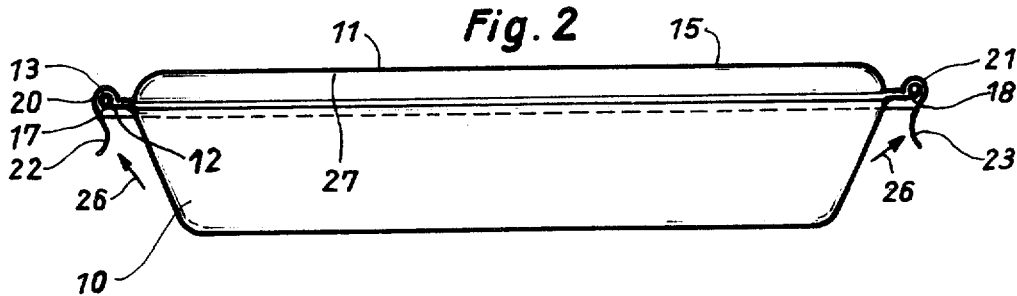
FIG. 2 is a sectional view along line A-B of FIG. 1.
Figure 3:
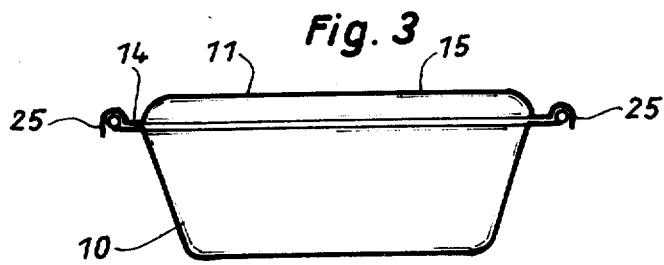
FIG. 3 is a sectional view along line C-D of FIG. 1.

The embodiment illustrated in FIGS. 1-3 comprises a receptacle 10 and a lid 11 held on the receptacle 10 for covering the same. The lid and the receptacle may each be made from a single aluminum, or similar blank by appropriate shaping.

Expediently, the lid 11 has a thickness of approximately 0.1–1.25 mm so that, on the one hand, it is relatively stiff and cannot be torn accidentally by hand during opening and, on the other hand, the danger of injury by the edges is avoided.

The receptacle 10 is of a structure known by itself and is formed as a serving dish. It has a continuous flange 12, the free edge of which is formed as a rolled-up portion 13. The upper planar zone of the flange 12 is engaged by the planar underside of a continuous groove-like depression 14 of the lid 11. The zone 15 of the lid 11 surrounded by the depression 14 is outwardly convex and is provided with embossings for increasing its rigidity and volume. The rolled-up edge 13 of the flange 12 makes it necessary for technological reasons that all four corners 16 be rounded as a quarter circle with a radius of curvature of about 1.5–2.5 cm. Portions of the edge 13 extending between the corners 16 are parallel in pairs and are longitudinally linear. At opposed short sides of the four-sided container, those edge zones of the lid 11 which are on the straight zones of the short sides, are bent downwardly and backwardly over and around the adjacent retaining zones 17, 18 of the flange 12 to constitute retaining clips 20, 21 which are arranged with respect to the opening plane of the receptacle 10 at an angle of approximately 110°–120°. Each retaining clip 20, 21 continues, along its entire length, in an integral grip tab 22, 23, respectively. As well shown in FIG. 2, each tab 22, 23 is bent to be outwardly concave, so that its free end is directed obliquely downwardly and outwardly.

Although the provision of a sole tab 22 or 23 would be sufficient, the use of two tabs — which, expediently, are mirror images of one another — has particular advantages. Thus, if the container is hot during opening because of its preceding heating, it may be immobilized by holding it down by one tab while disengaging the retaining clip of the opposite side by the other tab. Both tabs have a substantially lower temperature than the container wall and thus, even in case of a very hot container, they may be handled with ease. Furthermore, they additionally cool very fast when engaged manually. The provision of a second tab further makes it possible to disengage both retaining clips by displacing the two tabs outwardly and/or upwardly by an upwardly directed pressure from below and thus guide the lid securely with both hands. In case only one of the two tabs is operated and the other one is used only for immobilizing the container, the user has the possibility to utilize the more skillful hand for disengaging a retaining clip without the necessity of first turning around the container which might be problematical in view of the cramped conditions in an airplane.

From the retaining clip 20 to the retaining clip 21 along each side of the receptacle 10 there extends an edge zone 25 of the lid 11 (FIG. 3) which is bent, with respect to the opening plane of the receptacle 10, at right angles downward and which, if desired, may be separated by slits from the retaining clip 20, 21. Such slits, however, are generally not required. The bent edge zones 25, by virtue of their cooperation with the edge 13 prevent the lid 11 from being shifted in the longitudinal direction of the retaining zones 17, 18. It is noted that instead of a right angle, the zones 25 may extend obliquely inwardly at least along their linear portions in such a manner that an upward removal of the lid 11, however, will not be hindered. In some instances the edge zones 25 may be omitted in the rounded corner ranges of the lid 11.

The lid 11 may be removed by pressing upwardly and outwardly preferably both tabs 22, 23 in the direction of arrows 26 (FIG. 2). In this manner the lid is entirely disengaged from the receptacle 10 and may be entirely removed by one movement of the hand. The bulging portion 15 of the lid 11 is so designed that subsequent to its removal it may serve as a tray to be placed under the receptacle 10 whereby the latter and the inside 27 of the bulging portion 15 interengage in a form-fitting manner.

According to a modification not shown, the edge of the lid 11 extends in the ranges between the retaining clips along the inner side of the rolled-up edge 13 of the flange 12; in such a case the lid 11 terminates within that planar zone of the upper side of the flange 12 which is bounded at the outside by the rolled-up edge 13.

In FIG. 1 there is shown in dash-dotted lines at 29 one of the retainer clips together with the grip tab in a developed condition.

Turning now to the embodiments of FIGS. 4, 5 and 6, the container shown therein consists of a lid 11' and a receptacle 10' which corresponds to the receptacle 10 of the embodiment according to FIGS. 1–3, except that the edge 13' of the flange 12' is rolled downwardly. The edge of the lid 11' is bent at two mutually parallel straight sides over the entire length thereof in a U-shaped manner downwardly and inwardly at approximately 180°. At the other straight flange ranges 17', 18' which constitute the retaining zones forming part of the receptacle 10', the edge of the lid 11' is bent downwardly from the plane of the opening of the receptacle by approximately 135° to form retaining clips 20', 21'. Each retaining clip 20', 21' continues in an integral grip tab 22', 23', respectively, which, in the manner shown, are angularly bent, so that their free ends are directed obliquely downwardly and outwardly. Often it is expedient that at the rounded corners 16' the lid 11' does not extend angularly downwardly, but terminates on the planar upper side of the flange 12' of the receptacle 10'; in such cases the corresponding edges of the lid 11' are aligned with the rounded corners of the receptacle 10'.

For removing the lid 11', one of the retaining clips, for example, the retaining clip 20' is manually bent upwardly by means of its associated tab 22' into the dash-dotted position 30. Thereafter the lid 11' may be slid in the direction of the arrow 31 along the opening plane of the receptacle 10' by pulling the tab 23' until the lid 11' is entirely separated from the receptacle 10'. During the aforenoted sliding motion, the two straight flange ranges 32 serve as guides for the bent-over portions 33 of the edge of the lid 11'. These portions extend bilaterally from one retaining clip to the other.

The provision of bent-over portions 33 is particularly advantageous if the lid is only slightly rigid or if a particularly well-secured connection between lid and receptacle is desired without foregoing, however, the possibility of easy opening.

The U-shaped portions 33 may be provided with slits 40 in such a manner that by means of the tab 22' or 23' the adjacent lid portion may be bent upwardly along a buckling line 42 which extends between opposed slits 40 and which may be provided in the lid 11' by embossing. In this manner the upwardly bent lid portion separates entirely from the flange of the receptacle, so that subsequently the lid 11' may be removed from the receptacle 10' by sliding it off parallel to the opening plane of the receptacle 10'.

It is seen that in both embodiments the lid 11 or 11' may be entirely removed without further deformation subsequent to the disengagement of one of the two retaining clips.

What is claimed is:

1. In a two-part thin-walled metal container for storing and serving prepared food, said container being of the type that has (a) a receptacle and (b) a lid removably secured to said receptacle for covering the same, the improvement comprising,
   A. an external reinforcing flange having a smooth horizontally extending portion and a rolled portion at its outer edge, with two opposed sections of the flange forming retaining zones;
   B. two opposed edge zones forming part of said lid, said edge zones corresponding in their extent to respective ones of the retaining zones, each said edge zone having a first portion which fits flat against the horizontally extending portion of its respective corresponding retaining zone and a second portion which extends outwardly from the first portion and is bent from above downwardly and inwardly about the rolled portion of its respective corresponding retaining zone, each said bent zone constituting a retaining clip
   C. an integral grip tab adjoining at least one of said retaining clips for disengaging the latter from the corresponding retaining zone of said flange;
   D. two further opposed sections of the flange; and
   E. two further opposed edge zones of said lid, said further edge zones corresponding in their extent to respective ones of the further opposed sections of the flange, each said further edge zone having a first portion which fits flat against the horizontally extending portion of its respective corresponding flange section and a second portion which extends outwardly from the first portion and is bent to form a guide way for the outer edge of its respective corresponding flange section, wherein:
      i. said lid is free of score lines; and
      ii. said lid can be removed from the receptacle without severing and utlizing said guide ways.

2. An improvement as defined in claim 1, said lid having a wall thickness of approximately 0.1–0.25 mm.

3. An improvement as defined in claim 1, wherein both said retaining clips continue in an integral grip tab.

4. An improvement as defined in claim 1, said grip tab having a free end extending obliquely downwardly and outwardly with respect to said receptacle.

5. An improvement as defined in claim 4, said grip tab being outwardly concave.

6. An improvement as defined in claim 1, said further opposed edge zones of said lid being bent downwardly at about 90° with respect to the opening plane of said receptacle and extending on either side of said lid substantially from one said retaining clip to the other.

7. An improvement as defined in claim 1, including a plurality of slits provided in the edge zone of said lid, one slit being disposed adjacent each end of each said retaining clip.

8. An improvement as defined in claim 1, wherein each said retaining zone of the receptacle flange extends, with the associated retaining clip of the lid, at least substantially over the entire length of a container side.

9. An improvement as defined in claim 1, said further opposed sections of the flange are parallel straight edge zones extending from one said retaining zone of said receptacle flange to the other, said guide ways serving as guides for the sliding movement of said lid with respect to said receptacle subsequent to the disengagement of at least one of said retaining clips from the associated retaining zone of said receptacle flange.

10. An improvement as defined in claim 1, wherein that portion of the retaining clip that is disposed beneath the associated retaining zone of the receptacle continues obliquely downwardly from said retaining zone with respect to the opening plane of said receptacle.

11. An improvement as defined in claim 1, said lid having two opposed further edge zones extending normal to said retaining clips and being bent downwardly from the opening plane of said receptacle at an angle of approximately 100°–120°.

12. An improvement as defined in claim 7, said lid including preformed crease lines, each extending across said lid and connecting said slits in pairs.

13. An improvement as defined in claim 1, wherein said flange of said receptacle extends outwardly approximately in the plane of the receptacle opening.

* * * * *